United States Patent [19]

Boyd et al.

[11] Patent Number: 5,023,727

[45] Date of Patent: Jun. 11, 1991

[54] METHOD AND DEVICE FOR PRODUCING A SUBSTANTIALLY CONTINUOUS COMPOSITE VIDEO SIGNAL

[75] Inventors: Ian A. R. Boyd, 149 4th Ave., Milford, Conn. 06460; William J. Rose, West Hartford, Conn.; George A. Schaeffer, Clinton, Mass.

[73] Assignee: Ian A. R. Boyd, Milford, Conn.

[21] Appl. No.: 420,827

[22] Filed: Oct. 12, 1989

[51] Int. Cl.$^5$ ............................................. H04N 5/782
[52] U.S. Cl. ................................. 358/310; 358/335; 358/141; 358/145; 358/142; 360/14.1; 360/14.2; 360/72.2
[58] Field of Search ................................. 358/141–147, 358/310, 335, 185; 360/10.1, 10.2, 10.3, 72.1, 72.2

[56] References Cited

U.S. PATENT DOCUMENTS 4,422,105 12/1983 Rodesch et al. ..................... 358/335
4,543,616 9/1985 Brooks ................................. 358/335

Primary Examiner—Robert L. Richardson
Attorney, Agent, or Firm—St. Onge, Steward, Johnston & Reens

[57] ABSTRACT

This invention relates to methods for forming a substantially continuous composite video signal. A method for forming a composite signal comprises providing a video signal preprogrammed with data, reading or decoding and storing the data, determining where to combine a video field assembled from the data with the video signal, and combining the video field with the video signal by switching between the two. A method for forming a substantially continuous video signal comprises providing a video signal preprogrammed with data, reading or decoding and storing the data, receiving input indicating a desired video signal segment, determining the gap before locating the desired video signal segment, and filling the gap with a video segment assembled from the data. In another aspect, this invention also relates to a device for carrying out the methods of the invention.

76 Claims, 12 Drawing Sheets

METHOD AND DEVICE FOR PRODUCING A SUBSTANTIALLY CONTINUOUS COMPOSITE VIDEO SIGNAL

TECHNICAL FIELD

This invention relates to a method and device for combining fields created from digital data with a video signal and, more specifically, for combining RGB fields created from digital data with a video signal containing the digital data for creating the fields.

BACKGROUND ART

A Variety of computer-based and interactive video systems, and computer video peripheral devices and methods are known in the art. French patent application No. 2 449 936 to Bestougeff discloses an audio visual information system combining a computer and tape machine with a TV monitor to allow the screen to display information from the tape machine and from the computer.

U.S. Pat. No. 4,375,101 to Cerracchio discloses a system for formatting data on video tape comprising three redundant blocks of data words between four sets of three redundant sync words, all between vertical sync pulses of the video signal. U.S. Pat. No. 4,422,105 to Rodesch et al., related to Cerracchio, discloses an interactive video display system controlled by program information on a prerecorded program medium. The prerecorded program medium comprises a plurality of data dump segments, and a plurality of live video segments each proceeded by a data dump segment. The system senses pulses from the control track of the prerecorded program medium to determine the position of the prerecorded program medium.

U.S. Pat. No. 4,425,581 to Schweppe et al. discloses a system for overlaying a computer generated video signal onto an NTSC video signal.

U.S. Pat. No. 4,498,098 to Stell discloses an apparatus for combining and overlaying video signals from a video source with computer generated graphics/text output on a single display. The apparatus converts the NTSC video source signal to RGB format and combines this with the computer generated RGB output.

U.S. Pat. No. 4,530,048 to Proper discloses a video cassette recorder backup controller that can be installed in a S-100 bus system to provide temporary storage for the bus system.

U.S. Pat. No. 4,531,154 to Hallock discloses a conditioning circuit for a video display processor arranged to overlay a video signal with graphics comprising a sync stripper for the video signal and a clean sync generating circuit.

U.S. Pat. No. 4,599,611 to Bowker et al., related to Stell, discloses an interactive computer-based system for combining on a common display, as overlayed images, video signals from a source with graphics and text from a computer. The video signals are converted to RGB format and then combined with the RGB formatted computer output on a pixel-by-pixel basis.

U.S. Pat. No. 4,644,423 to Buntsis et al. discloses a method and apparatus for controlling first and second program sources comprising a control means causing playback of the second program source during commanded search operation of the first program source.

U.S. Pat. No. 4,689,022 to Peers et al. discloses a system for control of a video storage device by a programmed processor which executes a program obtained from the video storage means unless user interaction preempts the program.

SUMMARY OF THE INVENTION

It is an object of this invention to provide a method and device for overlaying fields of a video signal with video fields created from digital data previously read from the video signal to form a composite video signal. It is another object of this invention to provide a method and device for filling a gap between a current field of a video signal and a beginning field of a desired video segment with a video segment created from digital data previously read from the video signal to form a substantially continuous video signal. It is yet another object of this invention to provide a method and device for combining fields from a video signal with video fields created from digital data previously read from the video signal to form a substantially continuous composite video signal.

These and other objects are achieved by the provision of methods for forming a composite video signal, a substantially continuous video signal, and a substantially continuous composite video signal. The method for forming a composite signal comprises providing a video signal preprogrammed with data, reading or decoding and storing the data, determining where to combine a video field assembled from the data with the video signal, and combining the video field with the video signal by switching between the two.

The method for forming a substantially continuous video signal comprises providing a video signal preprogrammed with data, reading or decoding and storing the data, receiving input indicating a desired video signal segment, determining the gap before locating the desired video signal segment, and filling the gap with a video segment assembled from the data.

The method for forming a substantially continuous composite video signal comprises combining the steps of both methods.

In another aspect, this invention also relates to a device for carrying out the methods of the invention. In one embodiment, the device comprises means for reading or decoding and storing data from a preprogrammed video signal, means for receiving input indicating a desired segment, means for locating the desired segment, a video processor for assembling non-phase-modulated fields, means for switching between the video signal and non-phase-modulated fields, and a microprocessor responsive to the data and input for controlling the video processor and switching means to form a substantially continuous composite video signal.

The invention and its particular features will become more apparent from the following detailed description when considered with reference to the accompanying drawings.

DETAILED DESCRIPTION OF THE INVENTION

Figure 1:
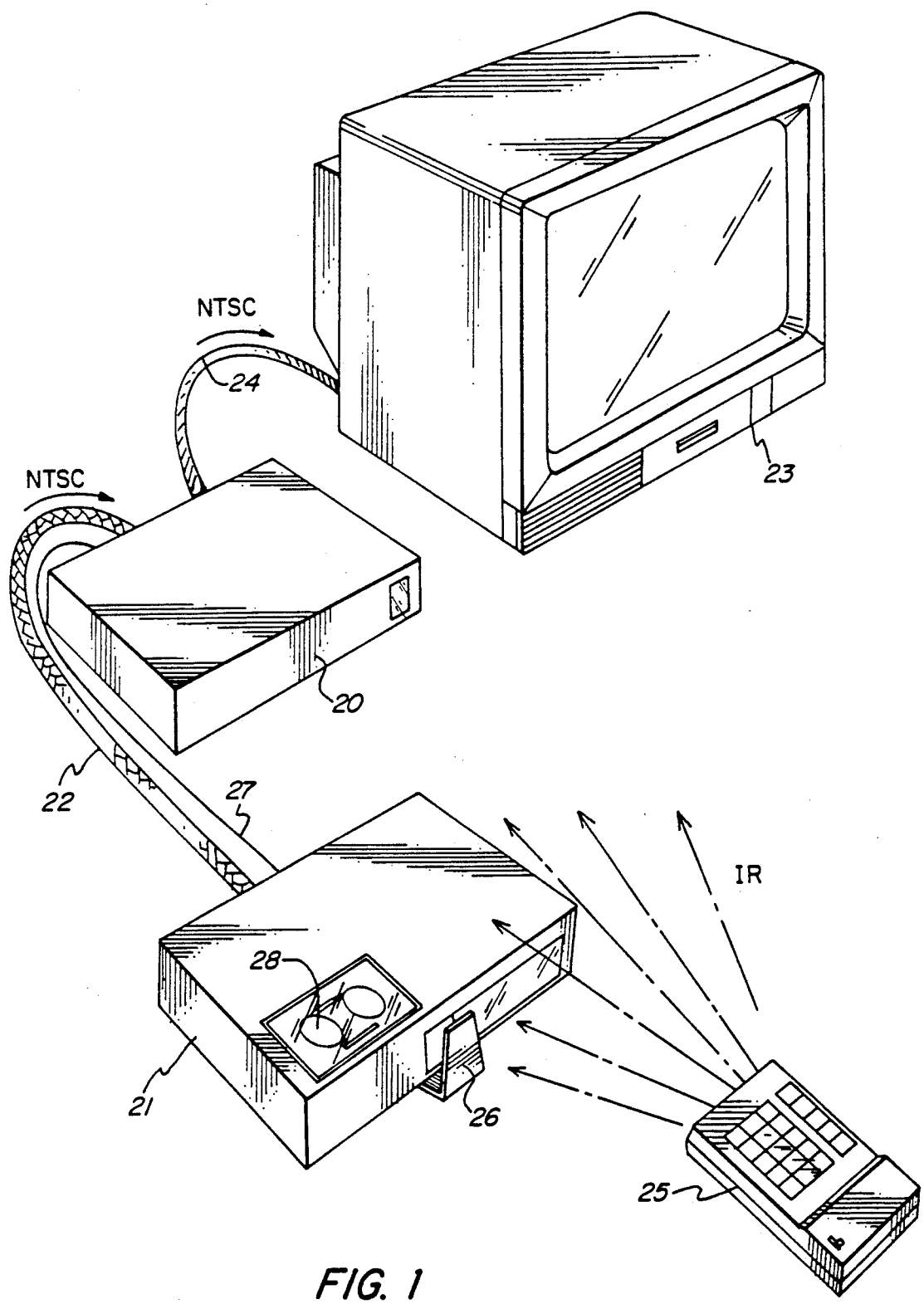
FIG. 1 is a perspective view depicting a device in accordance with this invention connected in a preferred configuration to both a TV monitor and a video tape recorder.

FIG. 1 depicts a device 20 in accordance with this invention, in a preferred configuration receiving an NTSC standard video signal input from a video tape recorder (VTR) 21 along line 22. Device 20 is also connected to a TV monitor 23 to which device 20 transmits an NTSC video signal along line 24. Although the video signals received and transmitted by device 20 are shown as NTSC formatted video signals, other standards such as SECAM, PAL and the like are possible. Further, the NTSC formatted or other video source signals preferably include an audio portion.

The operation of device 20 may be controlled by a user with a keypad 25. Keypad 25 may be conveniently provided as an infra-red (IR) remote, but may also be a wired remote, built directly into the device or the like. Device 20 in turn controls VTR 21 via line 27 preferably leading to IR wand 26. Control of VTR 21 by device 20 may be accomplished in a variety of other ways, however, IR wand 26 is preferred because it permits device 20 to be used with a variety of VTRs or other video storage devices and because it enables control of VTR 21 without either user actuation or internal modifications to the VTR.

VTR 21 is preferred as a video storage device because of its current wide availability, however, video-disc players and other video storage devices are possible and can be similarly controlled via line 27 to read and locate portions of a video signal preprogrammed (as described below) on a video tape 28. It is understood that video storage mediums other than video tape 28 are possible as required by the video storage device employed.

As will become apparent with further discussion of device 20 below, it is not necessary that device 20 control a video storage device to locate and read the preprogrammed video signal from the video storage medium. All device 20 requires in this configuration is a preprogrammed video signal input which may be provided by a CATV system, a local broadcast receiver or the like.

As configured, device 20 functions to read digital data from the preprogrammed video signal, create RGB or other non-phase-modulated fields of video from the digital data, and combine the fields with the video signal for display on TV monitor 23. As used herein, what is meant by RGB fields is an otherwise standard RGB signal which is interleaved in TV monitor fashion.

The particulars of these functions will be discussed below. Also discussed below are other configurations of device 20 and the functions related thereto.

Figure 2:
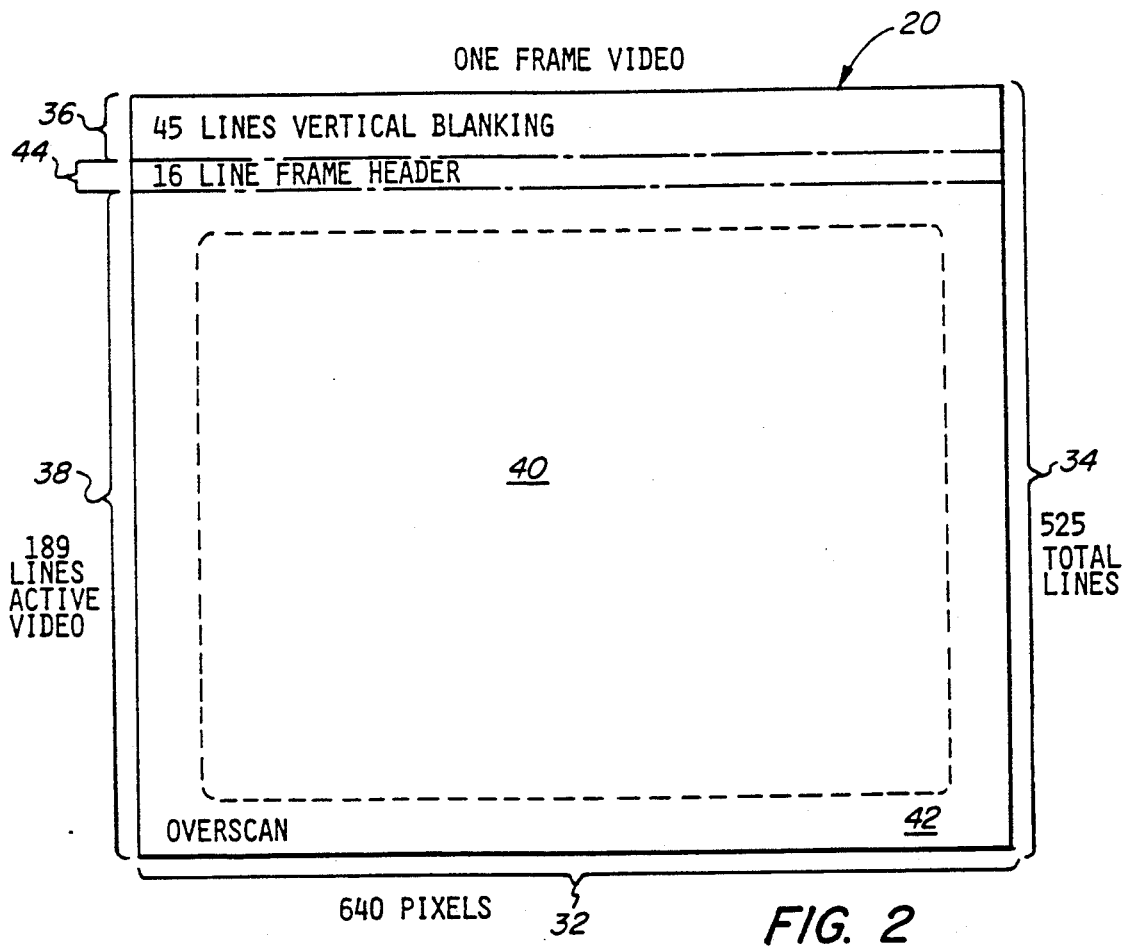
FIG. 2 is a schematic of one frame of a video signal illustrating the size and location of a frame header.

Referring to FIG. 2, a frame 30 of a preprogrammed NTSC video signal is schematically shown. Frame 30 is 640 pixels wide as indicated at 32 and 525 lines high as indicated at 34. The first 45 lines of any frame 30 comprise a vertical blanking area 36 which is used for closed captioning, broadcast identification, sync and other information. Vertical blanking area 36 is followed by 480 lines of active video as indicated at 38.

Active video 38 is divisible into a viewable portion 40 and an overscan area 42. Within overscan area 42, at the top of the active video 38 the device and method of this invention make use of a preprogrammed 16 line frame header 44. Frame header 44 is preferably located in overscan 42 above viewable portion 40 rather than below it because VTRs change heads near the bottom of every frame 30 making data recovery potentially unreliable.

Each frame 30 of the video signal comprises two fields scanned in interleaving fashion. In this regard preprogrammed 16-line frame header 44 comprises two 8-line field headers.

Figure 3:
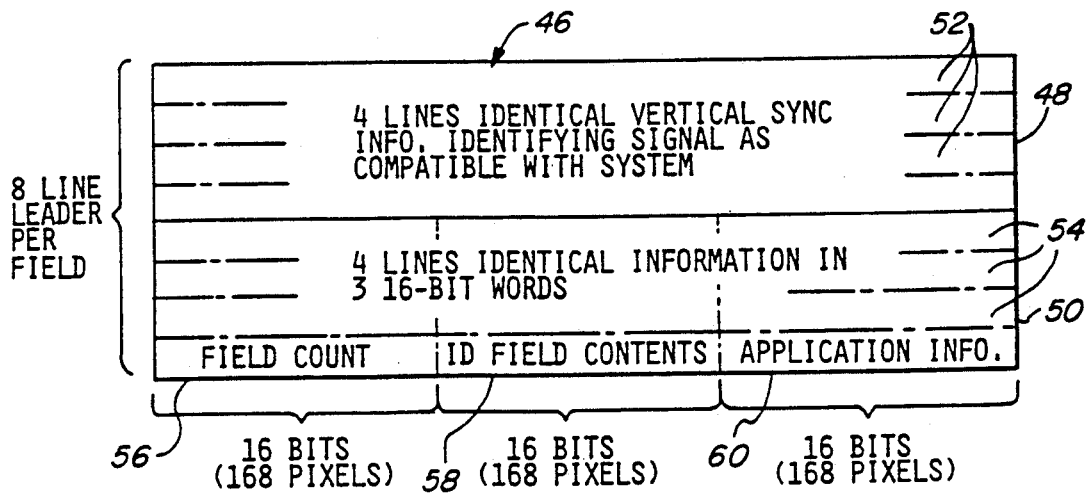
FIG. 3 is a schematic of a field header, two of which comprise the frame header of FIG. 2, illustrating the arrangement and contents thereof.

A preprogrammed field header 46 is shown in more detail in schematic FIG. 3. Every field header 46 comprises two four-identical-line portions 48 and 50. The four identical lines 52 of portion 48 identify the video signal as compatible with the device and method of this invention, and provide a vertical sync for the four identical lines 54 of portion 50. The four identical lines 54 of portion 50 each contain three 16-bit data words 56, 58, and 60.

Data word 56 is a unique field count identifying and placing the current field within the video signal. Data word 58 lists or identifies the contents of the current field, i.e. whether video, data or a combination of both. Data word 60 is application specific information which may include a prompt or instruction to combine or overlay a current or approaching field of the video signal with a specific RGB graphic or field, and which may also include a prompt or instruction to combine or add the audio portion of a current or approaching field of the video signal with a specific digital audio effect or program.

Figure 4:
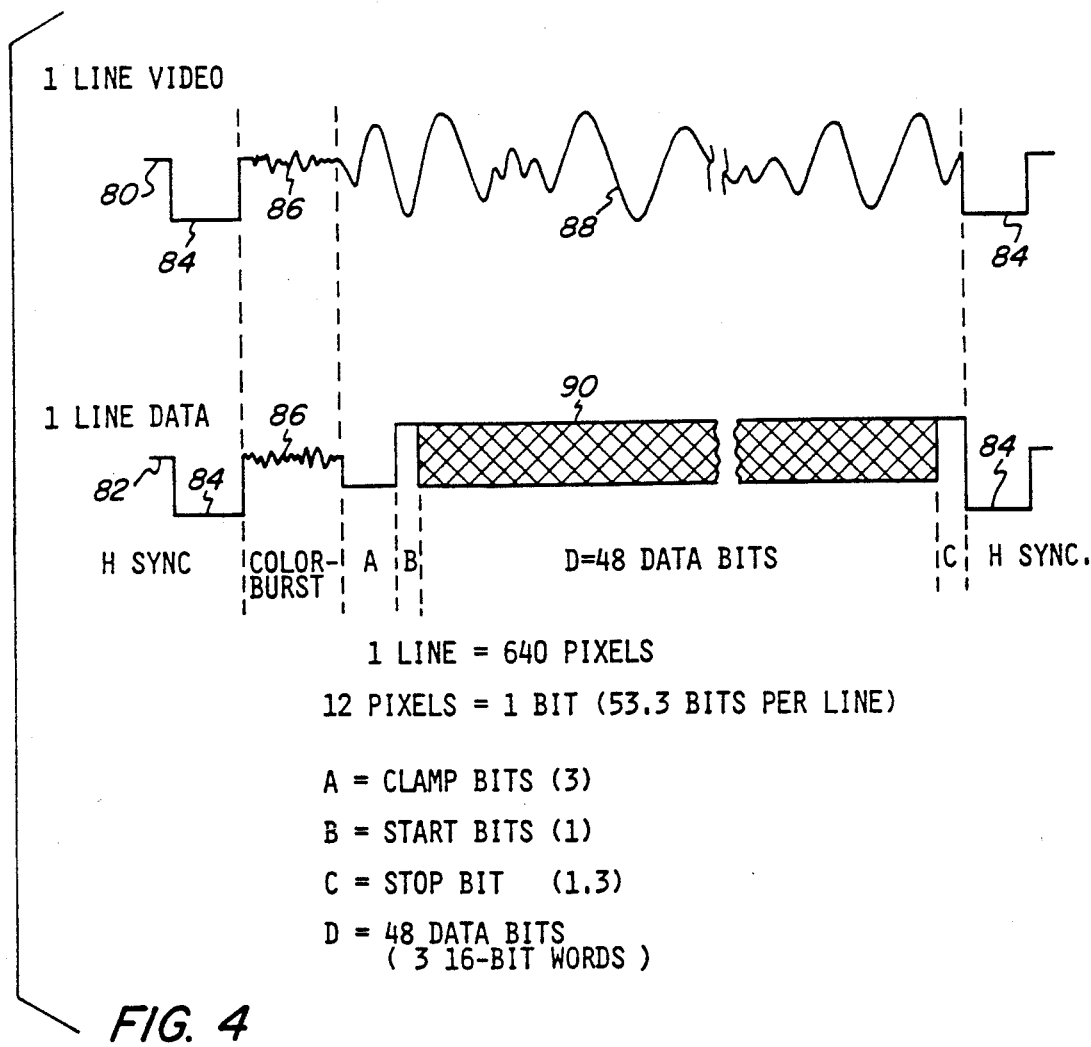
FIG. 4 is a schematic illustrating and comparing a line of standard video with a line of data.

Referring now to FIG. 4, a line 80 of NTSC standard video, and a line 82 of similarly formatted data are shown. Both lines 80 and 82 begin and end with horizontal sync pulses 84. Each frame, as discussed above, comprises 525 lines and 2 fields. Each field thus comprises 227½ lines and begins and ends with a vertical sync pulse (not shown). A color burst 86 follows horizontal sync 84 in both lines 80 and 82.

In line 80, colorburst 86 is followed by a line of video 88 comprising 640 pixels. In line 82, colorburst 86 is followed by a line of 53.3 bits 90.

12 pixels are equivalent to 1 bit. The first 3 bits in line 90 are clamp bits A which provide a reference level to the read circuitry. The next bit in line 90 is a start bit B indicating the beginning of data. The data comprises 48 data bits D or three 16-bit data words.

Figure 5:
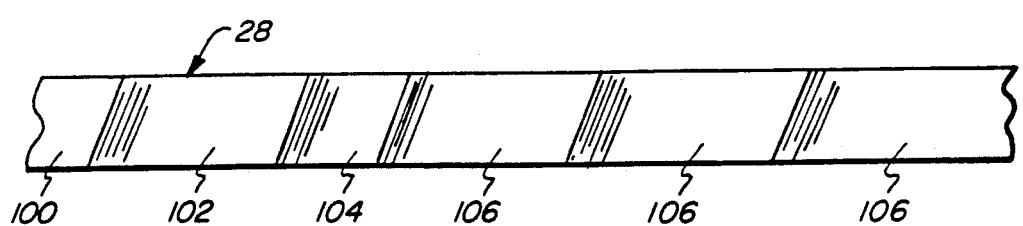
FIG. 5 is a partial schematic illustrating a video tape for use with the device of FIG. 1.

FIG. 5 is a partial schematic of video tape 28. Video tape 28 is preprogrammed to provide a preprogrammed video signal input to device 20 (see FIG. 1). Preprogrammed video tape 28 includes a leader 100, a data segment 102 preferably following leader 100, and empty segment 104 for writing changes and additions to the tape, and a plurality of video segments 106. Neither the size nor the proportion of the tape segments just described is indicative of their true size or proportion Indeed, as will be described below, an author of the preprogrammed signal determines the lengths of each of these segments. Further, although data segment 102 is disclosed as following directly behind leader 100, in a more generalized application a physical directory indicating the location of video tape 28 of every segment may follow behind leader 100, permitting data segment 102 to be located at any or several locations on video tape 28. Wear and tear on VTR 21 (see FIG. 1) is reduced by using a single data segment 102 and by placing empty segment 104 adjacent data segment 102. In addition to any data segment 102, the author of video tape 28 may "steal" additional data from a video segment by including one or more fields of data per second without visually altering the output to TV monitor 23.

Data segment 102 may include any or all of the following types of information depending upon implementation of device 20 by the author of the preprogrammed video tape:

information for assembling RGB or other non-phase-modulated video fields, information for combining a plurality of RGB video fields into video segments, tags to the length in fields or time duration of the RGB video segments, an index of which RGB field to combine or overlay with which field of the video signal, a directory of which field counts in the video signal define beginning fields of video segments, information for generating digital audio programs, tags to the length in fields or time duration of the digital audio programs, an index of which digital audio program to combine or add to which field of the video signal, an index of which digital audio program accompanies which RGB segment, and a script defining a default order in which RGB segments and video segments are combined together to form a substantially continuous video signal output.

Advantageously, the script may comprise a series of menu screens prompting user selections, and associated branching instructions. A command language for execution by device 20 to interpret the script and the data may also be preprogrammed on the tape. Alternatively, the command language may permanently reside within device 20.

Figure 6:
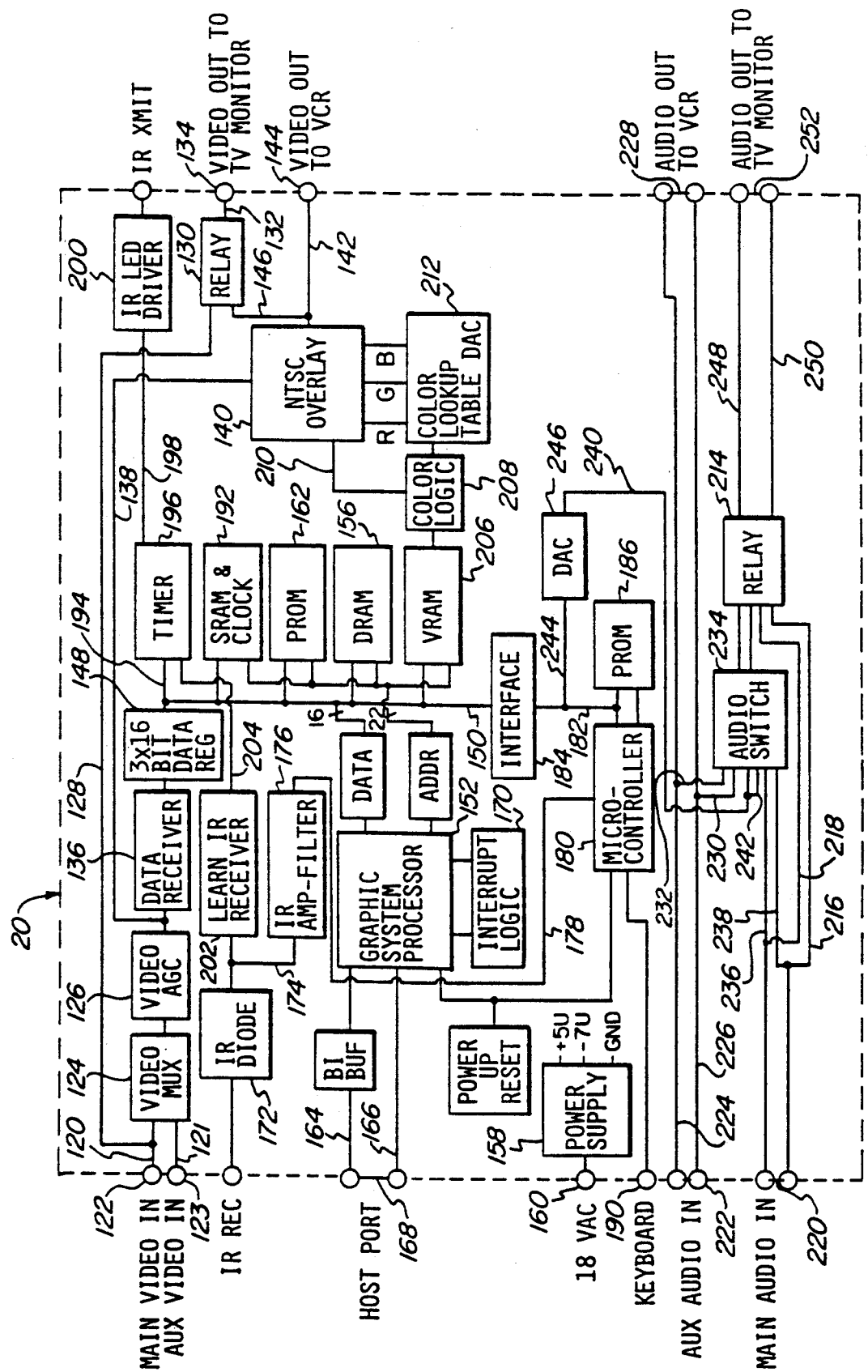
FIG. 6 is a schematic block diagram of the circuit comprising the device of FIG. 1.

Referring now to FIG. 6, a block circuit diagram illustrates the inputs to, outputs from, and general electronic structure of device 20. When configured as illustrated in FIG. 1, device 20 receives the preprogrammed video signal along line 120 from main video input 122 to video multiplexer (MUX) 124 and automatic gain control (AGC) 126. The video signal is also passed from main video input 122 along line 128 to video output relay 130 for direct output along line 132 to TV monitor video output 134 as a pass through for non-preprogrammed video signals. MUX 124 selects the input signal from between main video input 122 along line 120 and auxiliary video input 123 along line 121. AGC 126 normalizes the peak luminosity values of the preprogrammed video signal after which the signal is directed to data receiver 136 and along line 138 to NTSC overlay 140. NTSC overlay 140 combines the normalized video signal with RGB fields and outputs a substantially continuous composite video signal along line 142 to VTR video output 144 and along line 146 to video output relay 130. Horizontal synchronization is accomplished by the known method of a phase-locked loop. Vertical synchronization is either stripped from the video source or generated by device 20 and reset to the sync of the video source.

Data receiver 136 samples the luminosity of the normalized preprogrammed video signal at intervals along each line of the signal. The intervals are synchronized to the horizontal syncs of the signal. Using clamp bits A at the beginning of every data line 82 (see FIG. 4), data receiver 136 converts the sampled luminosity values of the normalized preprogrammed video signal to digital data. The digital data, if any exists on a given line of the preprogrammed video signal, is directed one line at a time to a $3 \times 16$ bit data register 148. Data register 148 separates each line of data into three 16-bit data words and sequentially directs the data words in bit parallel fashion along a 16-line data bus 150. Initially, all the data whether from the field headers or the data segment is stored by graphic system microprocessor 152 with an address bus 154 in dynamic random access memory (DRAM) 156.

Graphic system microprocessor 152 receives power from power supply 158 which generates +5 VDC and −7 VDC from 18 VAC input 160. Microprocessor 152 is initialized at power-up by routines stored in programmable read only memory (PROM) 162. Microprocessor 152 may advantageously be provided as a TMS 34010 manufactured by TEXAS INSTRUMENTS. The TMS 34010 and software supports a number of special effects such as exploded text, wipes, fades, filled polygons, spline curves, anti-aliased lines, 2-D animation, 3-D animation, rotations, blitting, transpositions, and more in real time together with objects comprising a combination of such effects which device 20 supports and which the script, prompts and user input may specify or request. The command language executed by the microprocessor 152 for interpreting and implementing the data including script, prompts, indexes, directories, user input and the like may also be resident in PROM 162 or alternatively may be read from data segment 102. In addition to being responsive to the data, microprocessor 152 may receive instructions from a host computer (not shown) along lines 164 and 166 from a host port 168, or from IR keypad 25 (see FIG. 1). Host computer control of microprocessor 152 is generally only used to author or edit a preprogrammed tape 28 as will be discussed below. User requests inputted with IR keypad 25 take precedence over the data for controlling microprocessor 152 except when specifically prohibited by preprogrammed data to do so. Interrupt logic module 170 facilitates the multiple tasking precedence of microprocessor 152.

IR pulses from IR keypad 25 are received at IR diode 172 which converts them to electrical pulses. The electrical pulses are directed along line 174 to IR filter 176 which passively eliminates most signals not intended for device 20, cleans the wave form and then directs it along line 178 to a microcontroller 180. Microcontroller 180 may advantageously be provided as an 8031 microprocessor designed by INTEL and manufactured by several companies including INTEL. Microcontroller 180 authenticates that the IR pulse was intended for device 20 and decodes the request contained therein. The request is then directed in bit parallel fashion along data bus 182 to interface 184. Interface 184 operates on hand shakes by microprocessor 152 and microcontroller 180 to pass data between data buses 150 and 182. In accordance with interrupt logic module 170, microprocessor 152 receives and carries out requests received via interface 184 along data bus 150.

Similar to microprocessor 152, microcontroller 180 receives power from power supply 158 and is initialized at power-up by routines stored in associated PROM 186. The command language executed by microcontroller 180 may also be resident in PROM 186 or alternatively may be read from data segment 102. In addition to decoding IR pulse input, microcontroller 180 also decodes input received from a keyboard (not shown) along line 188 from keyboard input 190. Further, microcontroller 180 is responsive to microprocessor 152 for generating and combining digital audio programs as discussed below.

Static random access memory (SRAM) 192 is preprogrammed with the IR codes for the six basic VTR commands: fast forward, rewind, play, stop, pause, and record for a large number of the most common VTR models/manufacturers. Once VTR 21 (see FIG. 1) connected to main video input 122 is identified, the IR command codes located in SRAM 192 are directed along line 194 from data bus line 150 to a timer 196. Timer 196 converts the command code to sequential electrical pulses of the proper frequency or gate for VTR 21 which are directed along line 198 to IR light-emitting diode (LED) 200. IR LED 200 converts the electrical pulses to IR pulses for controlling VTR 21. As depicted in FIG. 1, IR LED 200 comprises a wand 26 which may conveniently be placed in front of any remote VTR.

In the event IR codes for VTR 21 are not resident in SRAM 192, device 20 is able to learn the appropriate codes and store them in SRAM 192 for future use. In learn mode, IR diode 172 receives IR command codes directly from an IR remote control for the VTR (not shown). IR diode 172 converts the IR command codes to electrical pulses and directs the electrical wave form to a learn IR receiver 202 which cleans the wave form and directs it along line 204 to timer 196. Also in learn mode, timer 196 measures the frequency or gate of the incoming codes for each of the commands of a VTR or other video storage device. The commands may then be stored with a code for the VTR in SRAM 192 for future use. SRAM 192 includes a clock which pulse is used by microprocessor 152 to generate the internal vertical sync.

SRAM 192 is preferably provided with about 8 kbytes (kb) of memory to store command codes and set up initialization information for about 100 VTRs. Device 20 may identify the IR command codes for a VTR by sequentially trying the codes stored in SRAM 192 as discussed below with reference to FIGS. 8A and 8B. PROM 162 is preferably provided with between about 256 kb to about ½ Mbytes (Mb) or more of memory depending upon whether or to what extent microprocessor 152 command language is stored therein in addition to initialization routines for microprocessor 152 as well as start-up screens. DRAM 156 is preferably provided with about ½ Mb to about 2 Mb of memory which, in conjunction with vector and polygon oriented software, is sufficient to store up to about 100,000 fields of RGB or video graphics, or up to about 4,200 minutes of digital audio at about 8 notes per second, or a combination of both. A video random access memory (VRAM) 206 is also provided for assembling fields of RGB or video graphics prior to combination with the video signal. VRAM 206 includes a high speed output permitting pixel-by-pixel switching between a video signal field and an RGB field. Finally, PROM 186 is preferably provided with between about 2 kb to about 8 kb of memory depending upon whether command language for microcontroller 180 is stored therein in addition to initialization routines for microcontroller 180. Device 20 includes sufficient memory to download all the information needed to execute an entire video tape 28. To minimize wear and tear on VTR 21, all the information is also preferably downloaded at one time prior to executing video tape 28.

After fields of RGB or video graphics are assembled in VRAM 206 from data stored in DRAM 156, they are fast output to a color logic module 208 for determining which pixels of each field are "transparent". Transparent pixels are pixels of a predetermined color which indicate that the video signal output should comprise a pixel from the video signal input as opposed to the RGB field. Color logic module 208 generates a switching signal directed along line 210 to NTSC overlay 140 for actuating a pixel switch therein to create an output video signal by switching between fields from the video signal output and the RGB field.

Non-transparent pixels are directed from color logic module 208 to a color look-up table and digital to analog converter (DAC) 212. Color look-up table and DAC 12 converts fields of digital data to fields of analog RGB video. The fields of RGB video are then directed to NTSC overlay 140 for combination with the video signal input.

Similar to video output relay 130 which permits pass through of a non-preprogrammed video signal input, an audio output relay 214 permits pass through of the audio portion of a non-preprogrammed video signal input received along lines 216 and 218 from main audio input 220. As illustrated, device 20 supports stereo audio sources to both main audio input 220 and an auxiliary audio input 222. An auxiliary audio signal passes through device 20 along lines 224 and 226 to an auxiliary audio output 228. The auxiliary audio signal is generally only provided to author preprogrammed video tape 28. The auxiliary audio signal is also directed along lines 230 and 232 to an audio adder 234. Additional inputs to audio adder 234 include the main audio signal along lines 236 and 238, and a monaural digital audio audio program along lines 240 and 242.

The digital audio program is generated by microcontroller 180 from data stored in DRAM 156 and directed along line 244 to a digital to analog converter (DAC) 246. DAC 246 converts the digital audio program and then directs it to audio adder 234 for combination with the main and auxiliary audio signals. The combined audio signal is directed to audio output relay 214 along lines 248 and 250 to TV monitor audio output 252.

Figure 7:
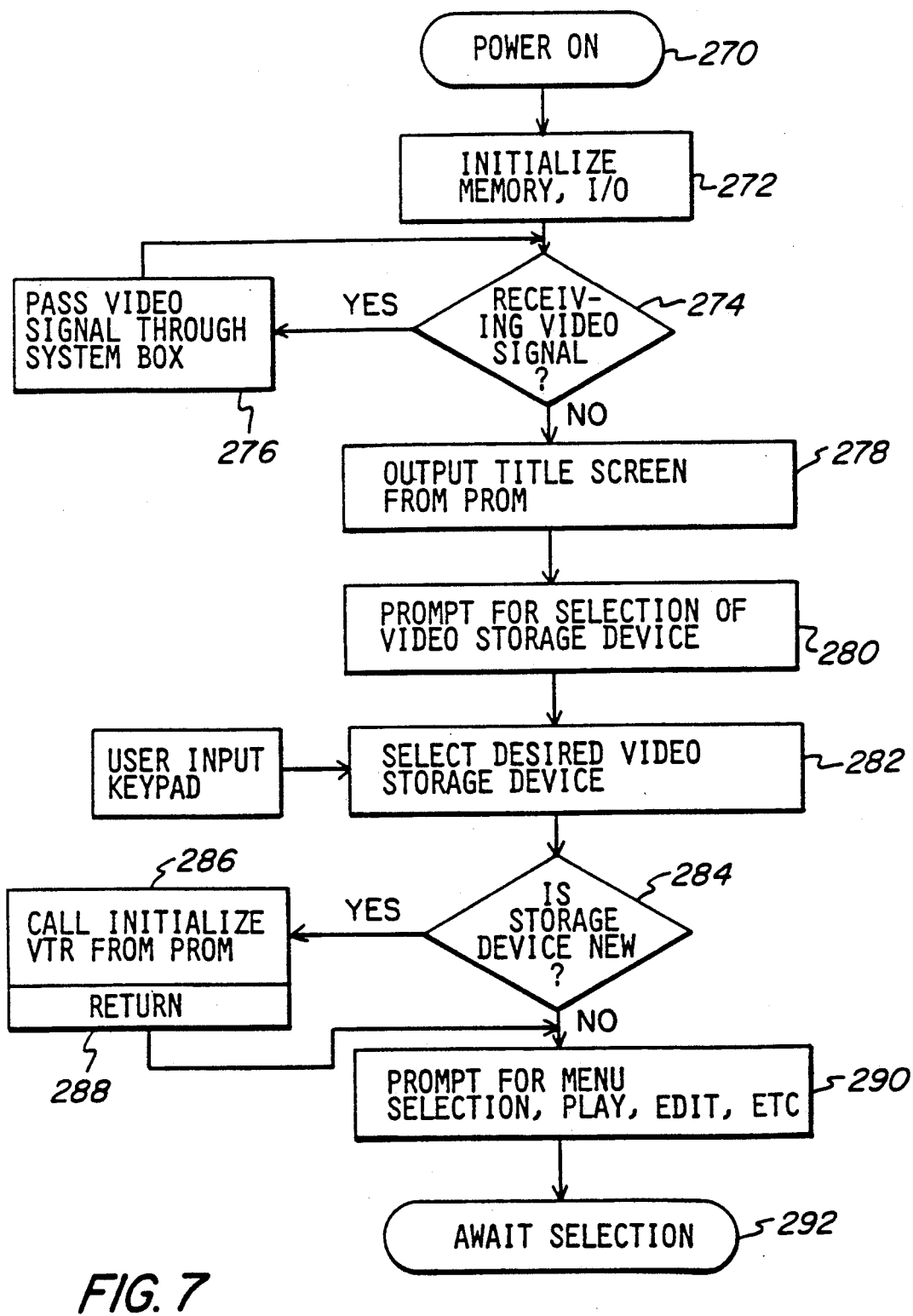
FIG. 7 is a flow diagram illustrating the start-up sequence executed by the device of FIG. 1.

FIG. 7 illustrates the start-up sequence executed by device 20 as configured in FIG. 1, when the power is turned ON at 270. First, Microprocessor 152 and microcontroller 180 initialize their memories and input- /output ports at 272 and then test at 274 to see if a video signal is being received at main video input 122. If there is a video signal being received then depending upon initialization information stored in SRAM 192 device 20 may continue to pass the video signal therethrough at 276 with relay 130 to TV monitor video output 134, until a video signal is no longer received, when device 20 outputs at 278 a title screen from PROM 162 welcoming the user to the system of device 20 or such like. After the title sequence, device 20 requests at 280 via TV monitor 23 that the user select a VTR or video storage device. Once the user selects at 282 a VTR using keypad 25, device 20 determines at 284 whether or not the selected VTR is new, i.e. it does not contain command code information for the VTR. If the selected VTR is new, then a VTR initialization routine is called at 286 from PROM 162. After the VTR is initialized at 288, or if the VTR is old, the user is next prompted at 290 for a menu selection and device 20 awaits the user's selection at 292.

Figure 8A:
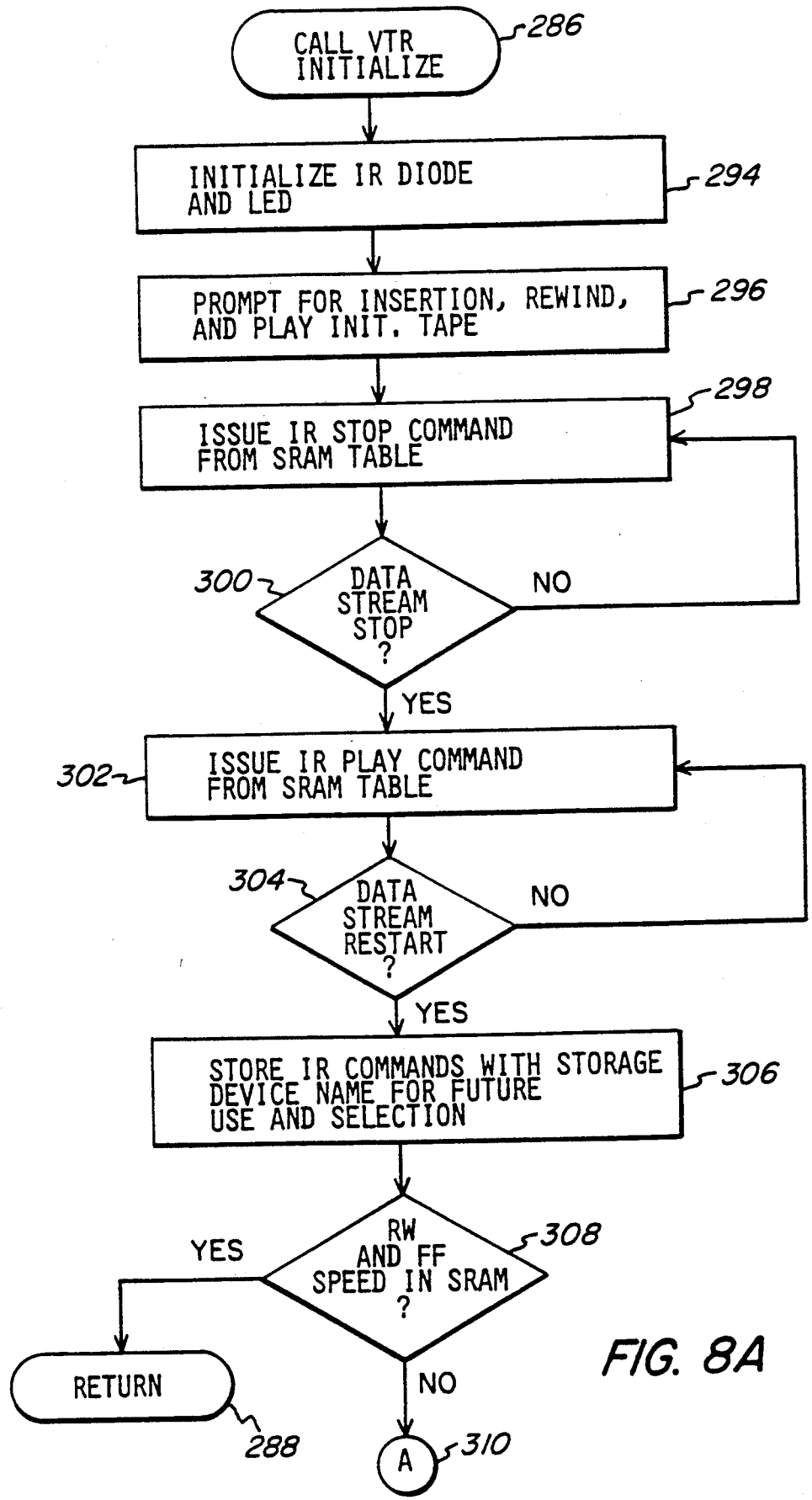
FIGS. 8A and 8B are flow diagrams illustrating a VTR initialization routine called by the start-up sequence of FIG. 6.
Figure 8B:
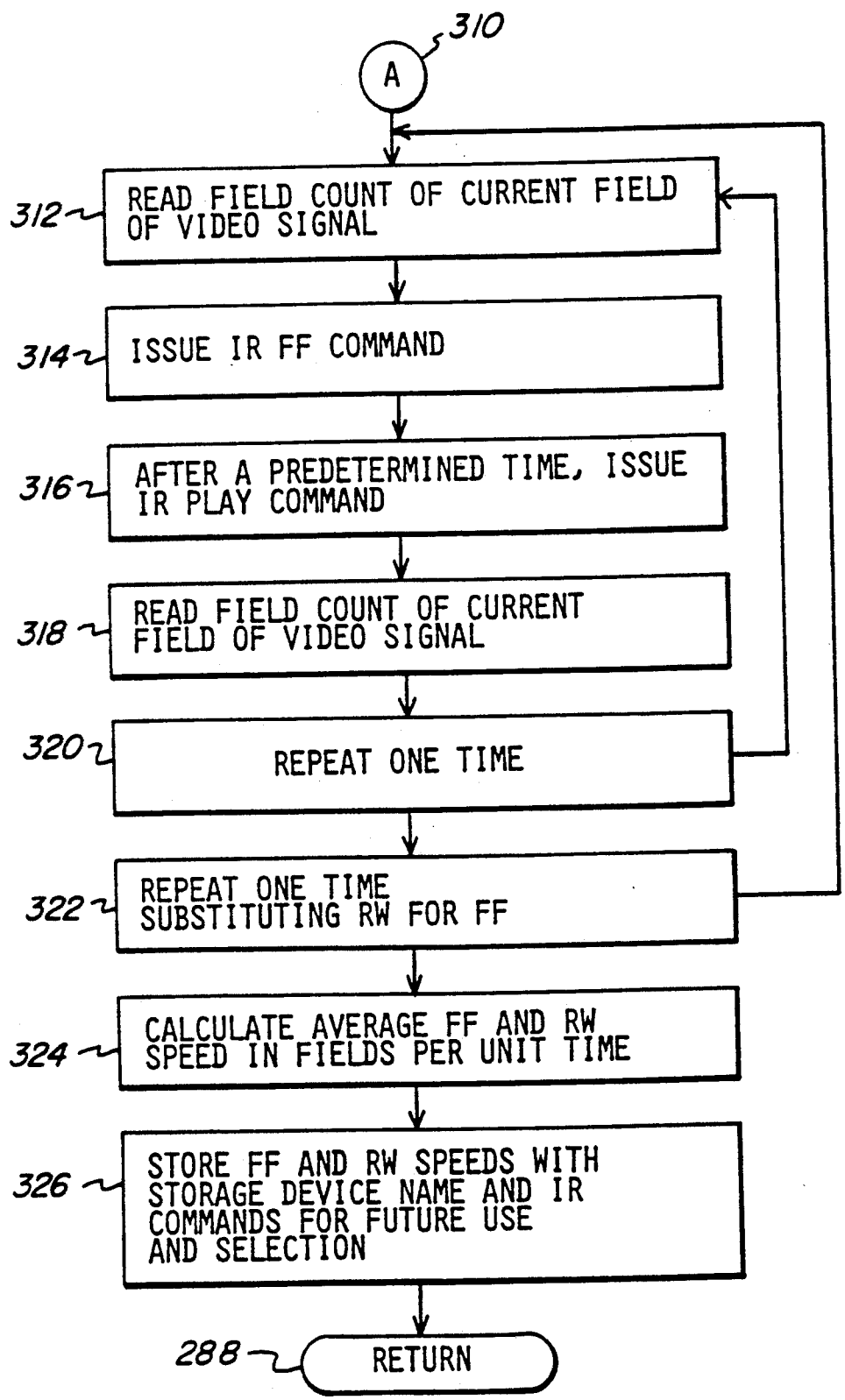

Referring now to FIGS. 8A and 8B, the VTR initialization routine called at 286 is illustrated. The first step in initializing VTR 21 is to initialize at 294 IR DIODE 172 and IR LED 200. Once the IR input/output is initialized, device 20 prompts the user at 296 on TV monitor 23 to insert, rewind and play an initialization tape (any video tape preprogrammed with field counts and data). When device 20 begins to receive data from the initialization tape, it issues at 298 an IR stop command code from SRAM 192. If the data fails to stop as tested at 300, then another IR stop command code is issued at 298. Once the data stream stops being received at device 20, identifying the IR stop command for VTR 21, device 20 issues at 302 an IR play command code from SRAM 192. Device 20 then tests at 304 to determine if the data stream has restarted. If not, then another IR play command code is issued at 302. Once the data stream restarts, the IR stop, play and associated command codes for pause, rewind (RW), fast forward (FF), and record are stored at 306 with the name of VTR 21 in SRAM 192 for future use. If the RW and FF speeds of VTR 21 were stored in SRAM 192 along with the command codes as determined at 308 then flow returns at 288 to the start-up sequence of FIG. 7. If, however, the RW and FF speeds need to be determined, the VTR initialization routine continues via junction A at 310 to FIG. 8B.

In order to determine the FF and RW speeds of device 20 with the initialization tape in play mode, device 20 reads at 312 the field count of the current field of the video signal, issues at 314 the IR FF command code, after a predetermined time issues at 316 the IR play command code, and reads at 318 the field count of the new current field. The process of steps 312 to 318 is repeated one time at 320. Then the process of steps 312 to 320 is repeated one time substituting RW for FF. Using the field counts, new field counts, FF time and RW time, the average FF and RW speed is calculated at 324 in fields per unit time. For increased accuracy, the speeds are calculated from play mode to play mode, taking any lapse between play and FF or play and RW into account. To further increase accuracy, the system of device 20 is preferably designed for preprogrammed video tapes 28 of thirty minute duration to minimize the fluctuation of FF and RW speeds from beginning to end of the tape. The FF and RW speeds are then stored at 326 in SRAM 192 along with the associated IR command codes for future use. The VTR initialization routine then returns at 288 to the start-up sequence of FIG. 7.

Figure 9:
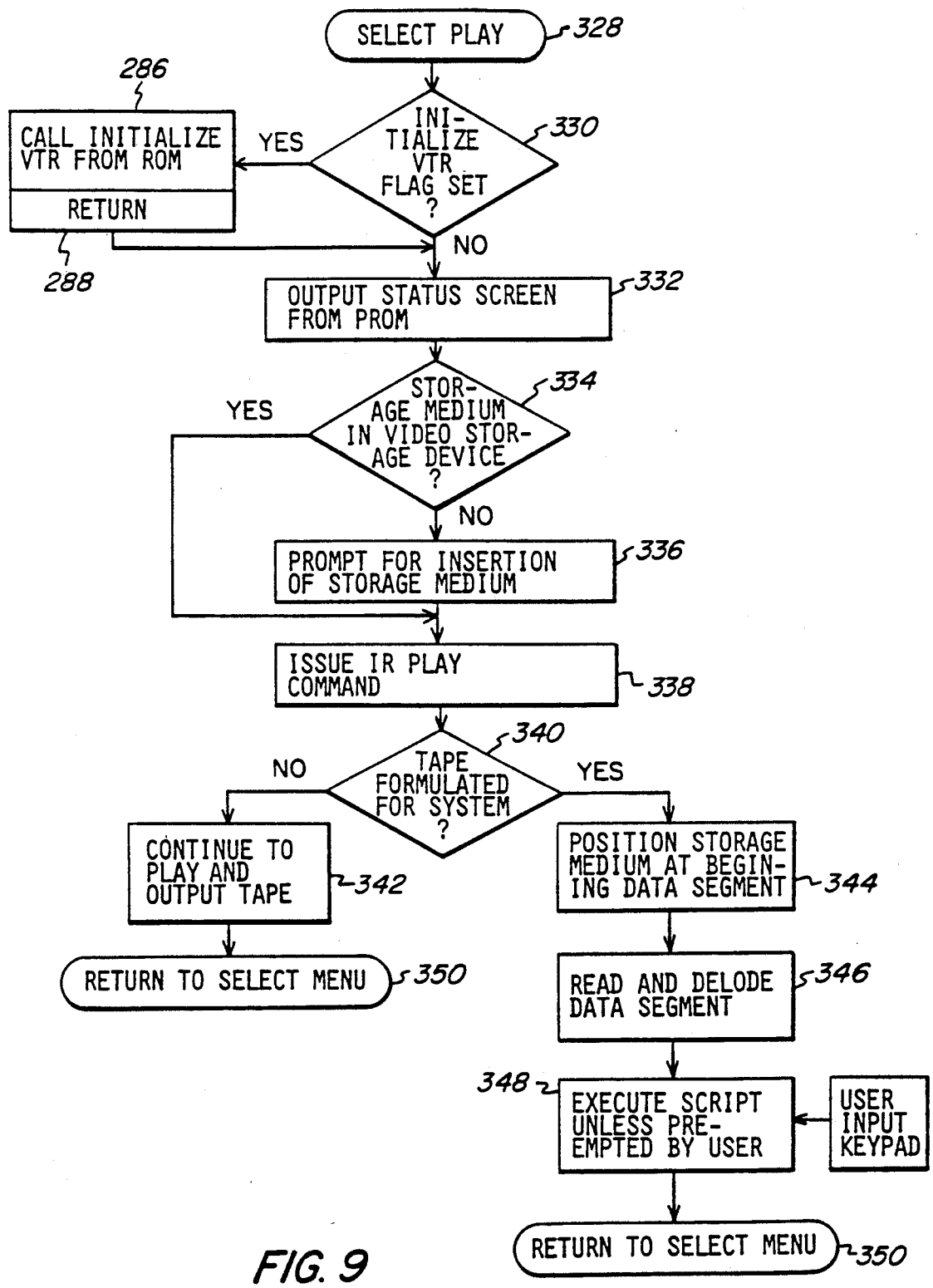
FIG. 9 is a flow diagram illustrating the steps taken by the device of FIG. 1 when the play command is selected.

FIG. 9 is a flow diagram illustrating the steps executed by device 20 when play is selected at 328 by a user from the menu displayed at 290 in FIG. 7 on TV monitor 23. Device 20 tests at 330 whether the VTR initialization flag is set, and if so calls at 286 the VTR initialization routine from PROM 162. If the VTR initialization flag is not set or when flow is returned at 288 from the routine, device 20 outputs at 332 a status screen from PROM 162 to TV monitor 23 while it tests at 334 whether video tape 28 is in VTR 21. If video tape 28 is not within VTR 21, then device 20 prompts at 336 for its insertion. Once video tape 28 is inserted, device 20 issues at 338 the IR play command and tests at 340 whether video tape 28 is preprogrammed with data. If it is not, then device 20 passes the video signal through at 342 to TV monitor 23 with video output relay 130 (see FIG. 6). If video tape 28 is preprogrammed with data, then device 20 positions at 344 video tape 28 at the beginning of data segment 102 (see FIG. 5) and reads or decodes at 346 data segment 102. Data segment 102 is stored on video tape 28 in four individual blocks which are read sequentially until a cyclic redundancy check (CRC) reveals no errors. Once the data segment is error free and stored in DRAM 156 (see FIG. 6), device 20 executes the script or prompts from field headers 46 (see FIG. 3) unless preempted by user input from keypad 25. After the video tape has been played, whether preprogrammed with data or not, flow returns at 350 to the prompt at 290 of FIG. 7 for a menu selection.

Figure 10:
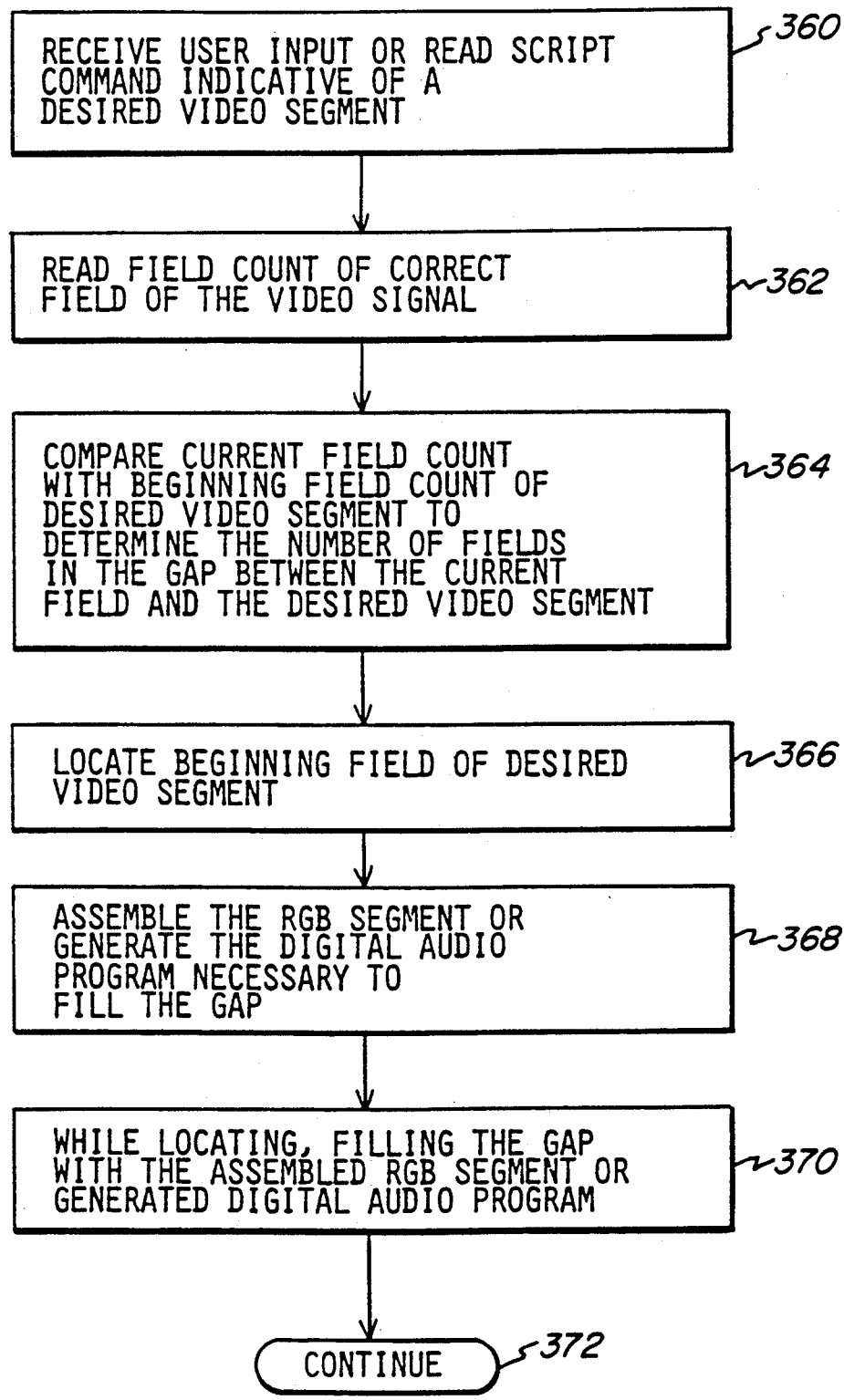
FIG. 10 is a flow diagram illustrating the method by which the device of FIG. 1 fills a gap between a desired video segment and a current field of the video signal.

FIG. 10 is a flow diagram illustrating the method by which device 20 fills gaps between a desired video segment and a current field of the video signal. At 360, microprocessor 152 of device 20 receives either user input from keypad 25 or a script command from DRAM 156 indicative of a desired video segment. Generally, gap filling is only necessary for video segments, because RGB segments are substantially instantaneously accessible from DRAM 156.

Next, device 20 reads at 362 the field count of the current field of the video signal. Microprocessor 152 compares at 364 the current field count with the beginning field count of the desired video segment from the directory of which field counts in the video signal define beginning fields of video segments to determine the number of fields in the gap between the current field and the beginning field of the desired video segment. Microprocessor 152 also uses the beginning field of the desired video segment to locate at 366 the desired video segment by issuing the IR FF command if the beginning field count is larger than the current field count and the IR RW command if the beginning field count is smaller. The time duration of either the FF or RW of video tape 28 is calculated by microprocessor 152 from the number of fields in the gap and the FF or RW speed in fields per unit time stored in SRAM 192. Alternatively, where the preprogrammed video signal is not stored on a local video storage medium by time shift recording or otherwise, the time duration of the gap may be calculated from the field scan rate of the signal, generally 60 fields per second for NTSC video, and the number of fields in the gap.

In the very short period of time while microprocessor 152 is determining the location of the desired video segment, microprocessor 152 is also at 368 assembling in VRAM 206 an RGB segment or generating with microcontroller 180 a digital audio program, from the information for assembling RGB fields or the information for generating digital audio programs in DRAM 156, necessary to fill the gap. Advantageously, RGB segments and audio programs are provided by the author in a variety of time durations from between about 10 seconds to about 60 seconds since searches on the preferred thirty minute video tape rarely take less than 10 seconds or more than 60 seconds on most current VTRs. The length of these segments and programs is advantageously adjusted to correspond to the access time of the video storage device. By reviewing the length or time duration tags associated with each RGB segment or audio program in DRAM 156, microprocessor 152 can select the RGB segment or audio program which is the least bit longer than the gap.

Next while locating the desired video segment, microprocessor 152 fills the gap by outputting at 370 either the assembled RGB segment through NTSC overlay 140 and on to TV monitor 23, or the generated audio program through audio switch 234 and on to TV monitor 23. When the time duration of the FF or RW period expires, microprocessor 152 issues the IR play command code and reads the field count of the current field. When the current field matches the beginning field of the desired video segment, microprocessor 152 immediately switches the output from the RGB segment or audio program to the desired video segment forming a substantially continuous video signal output. At the end of the desired video segment, microprocessor 152 continues at 372 by executing the next script command, user request, prompt or the like.

Figure 11:
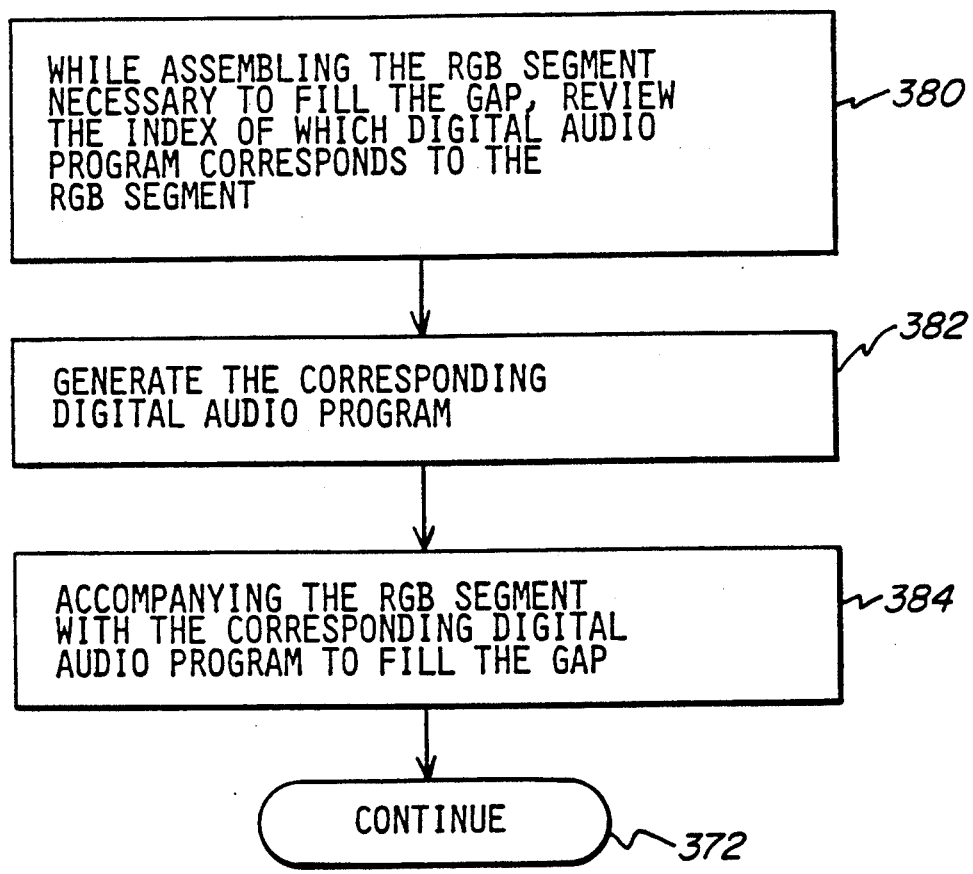
FIG. 11 is a flow diagram illustrating the method by which the device of FIG. 1 accompanies the gap filling segment derived by the method of FIG. 10 with a digital audio program.

FIG. 11 is a flow diagram illustrating the method by which device 20 accompanies the gap filling RGB segment with a digital audio program. Once microprocessor 152 has selected the gap filling RGB segment, the microprocessor reviews at 380 the index of which digital audio program corresponds to the RGB segment. Next, while microprocessor 152 assembles the RGB segment, microcontroller 180 generates at 382 the corresponding digital audio program. At 384, microcontroller 180 combines the digital audio program with the gap filling RGB segment through audio adder 234 and audio output relay 214 to accompany the RGB segment. Microprocessor 152 continues at 372 by executing the next script command, user request, prompt or the like.

Figure 12:
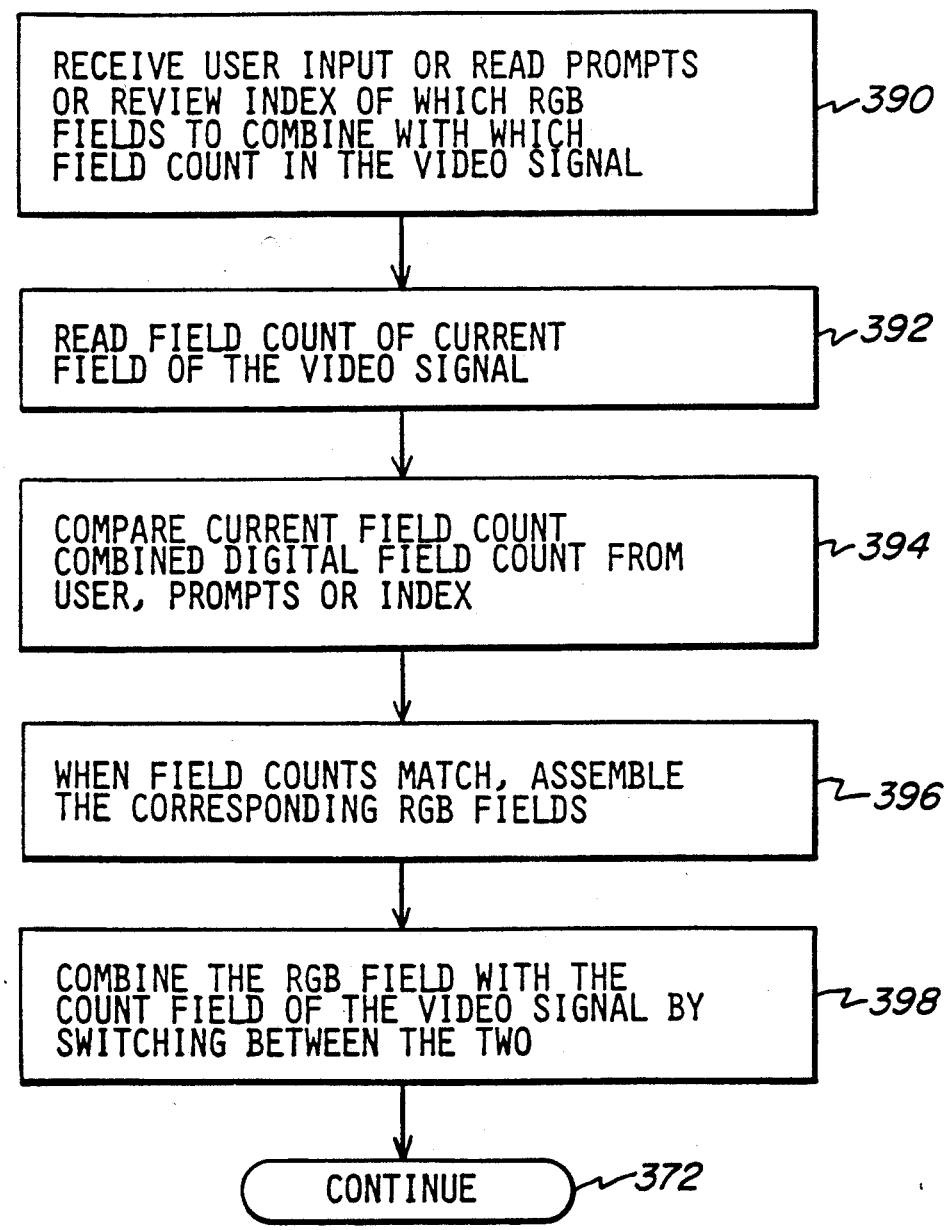
FIG. 12 comprises a flow diagram illustrating the method by which the device of FIG. 1 overlays a desired RGB field onto a field of the video signal.

FIG. 12 is a flow diagram illustrating the method by which device 20 overlays or substantially simultaneously combines a field of the video signal with a desired RGB field. At 390, microprocessor 152 receives user input or reads prompts or reviews the index of which RGB field to combine with which field count in the video signal. At 392, microprocessor 152 continuously reads the field count of the current field of the video signal and compares at 394 the current field count with the field counts from the user, prompts, and the index to look for any matches. Whenever the current field count matches a field count in either user input, field header prompts, or the index, microprocessor 152 assembles at 396 the corresponding RGB field in VRAM 206 from the information for assembling RGB fields stored in DRAM 156. Microprocessor 152 then combines at 398 the assembled RGB field with the current field of the video signal by switching on a pixel-by-pixel basis between the two fields with NTSC overlay 140 to form a composite video signal output. Microprocessor 152 continues at 372 by executing the next script command, user request, prompt or the like.

Figure 13:
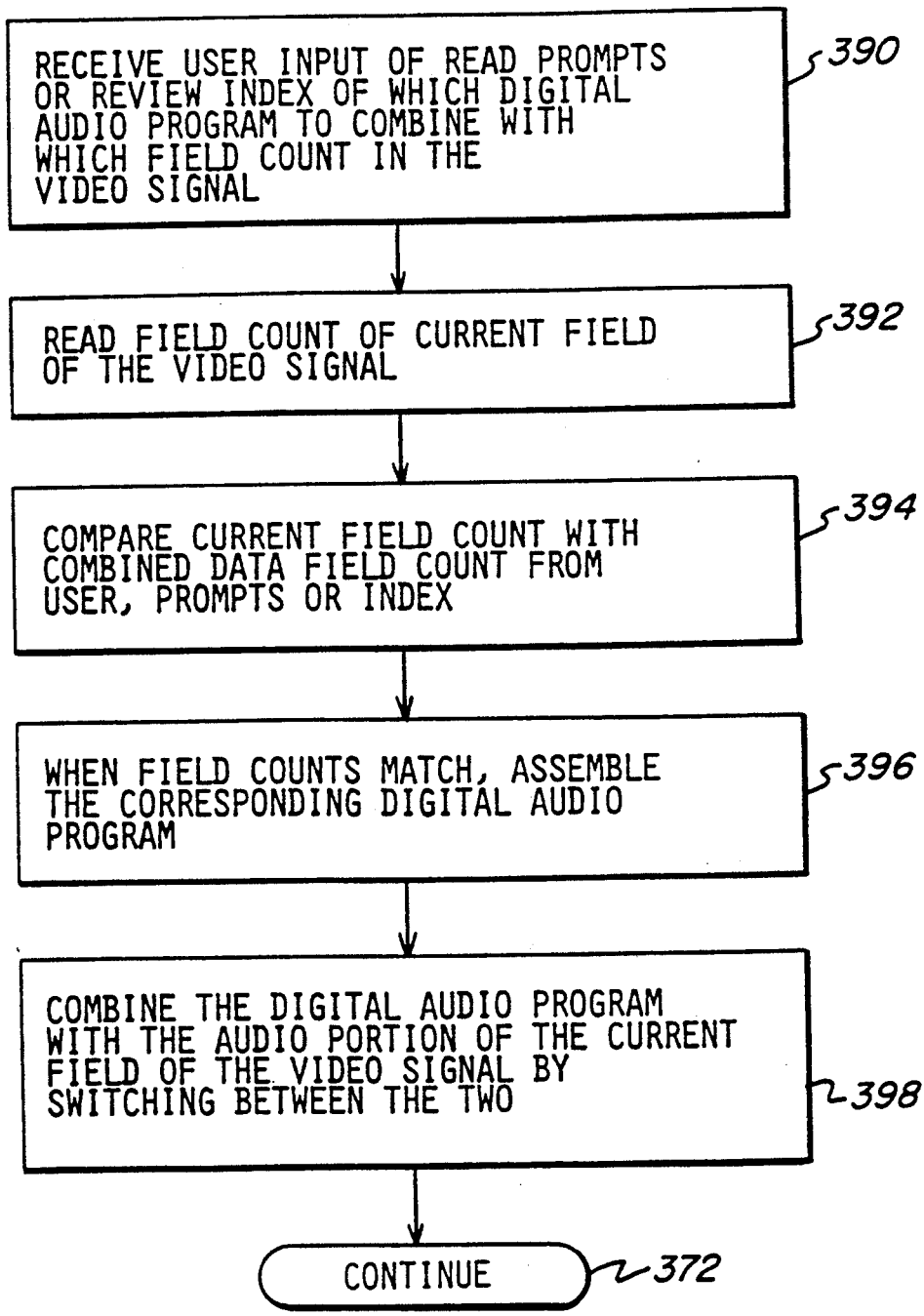
FIG. 13 is a flow diagram illustrating the method by which the device of FIG. 1 adds a digital audio program to a field of the video signal.

FIG. 13 is a flow diagram illustrating the method by which device 20 adds a digital audio program to the audio portion of a field of the video signal. At 404, microprocessor 152 receives user input or reads prompts or reviews the index of which digital audio program to combine with which field count in the video signal. At 406, microprocessor 152 continuously reads the field count of the current field of the video signal and compares at 408 the current field count with the field counts from the user, prompts, and the index to look for any matches. Whenever the current field count matches a field count in either user input, field header prompts, or the index, microcontroller 180 generates at 410 the corresponding digital audio program from the information for generating digital audio programs stored in DRAM 156. Microcontroller 180 then combines at 412 the generated digital audio program with the audio portion of the current field of the video signal by adding them together with audio adder 234. Microprocessor 152 then continues at 372 by executing the next script command, user request, prompt or the like.

In addition to the configuration of device 20 depicted in FIG. 1, the device may be configured in a variety of other ways to achieve a variety of additional functions. A connection between VTR 21 or like video storage device and VTR video output 144 (see FIG. 6) permits device 20 to edit and/or add to data segment 102. The corrections and additions may be conveniently stored on empty segment 104 of video tape 28 (see FIG. 5). Microprocessor 152 thus is capable of producing, as well as reading, the information for assembling RGB fields, the information for generating digital audio programs, the related indices and the like. The data thus produced may then be recorded on video tape 28 for future use using wand 26 to control VTR 21.

The actual RGB fields or screens from which microprocessor 152 produces the data may be assembled from templates stored in PROM 162 when adding to video tape 28, or especially when authoring video tape 28 may be created on the host computer and provided to device 20 via host port 168. When editing the video tape or any RGB fields thereon, a keyboard may conveniently be attached to keyboard input 190 (see FIG. 6) on device 20. Key codes from the keyboard are decoded by microcontroller 180 and directed through interface 184 to microprocessor 152.

The host computer may also be used to control device 20 for authoring preprogrammed video tapes 28. In this regard, the host computer may also produce digital audio programs and RGB fields for the authoring session. In addition, separate video input signals from sources such as video storage devices, video signal receivers, and video signal generators like scanners or cameras may be connected to both the main video input 122 and the auxiliary video input 123. The audio portions of each video signal may also be separately input at 220 and 222 to device 20. The authoring session comprises an author selective portions of a plurality of these audio and video inputs together with a script, and the host computer directing device 20 to prepare and record the necessary data, audio and video.

Although the invention has been described with reference to particular embodiments, configurations, features and the like, these are not intended to exhaust all possible features, and indeed many other modifications and variations will be ascertainable to those of skill in the art.

What is claimed is:

1. A method of combining RGB fields with a video signal to form a composite video signal comprising:
   providing a video signal preprogrammed in the video portion thereof with data, the data comprising
      a listing of what portion of the video signal includes the data,
      a field count in every field of the video signal,
      information for assembling the RGB fields, and
      an index of which RGB field to combine with which fields in the video signal;
   reading the listing of what portion of the video signal includes the data;
   decoding the data into the information for assembling the RGB fields and the index of which RGB field to combine with which fields in the video signal;
   storing the decoded data;
   reading a field count of a current field of the video signal;
   comparing the field count of the current field with the index of fields in the video signal to be combined with the RGB fields;
   whenever the current field count matches a field in the index, assembling the corresponding RGB field in the index from the information for assembling RGB fields; and
   combining the RGB field with the current field of the video signal by switching between the fields according to the information for assembling the RGB fields to form a composite video signal.

2. The method of claim 1 wherein the video signal is preprogrammed in the active video portion thereof with the data.

3. The method of claim 1 including:
   comparing the field count of the current field of the composite video signal with the index of fields in the video signal to be combined with the RGB fields; and
   whenever the current field count of the composite video signal no longer matches a field in the index, stopping the combining of the RGB field with the current field of the video signal by switching to the video signal alone.

4. The method of claim 1 including receiving user input indicating which RGB fields to combine with which fields in the video signal.

5. The method of claim 4 wherein user input indicating which RGB field to combine with which field in the video signal takes precedence over the index of which RGB field to combine with which fields in the video signal.

6. The method of claim 4 including receiving further user input indicating when to stop combining the RGB field with the current field of the video signal.

7. A method of combining RGB fields with a video signal to form a substantially continuous video signal comprising:
   providing a video signal preprogrammed in the video portion thereof with data, the data comprising
      a listing of what portion of the video signal includes the data,
      a field count in every field of the video signal,
      information for assembling the RGB segments, and
      a directory of field counts in the video signal which define the beginning field of user selectable video signal segments;
   reading the listing of what portion of the video signal includes the data;
   decoding the remaining data into the information for assembling the RGB segments and the directory of field counts in the video signal which define the beginning field of user selectable video signal segments;
   storing the decoded data;
   receiving user input indicating a desired user selectable video signal segment;
   reading the field count of the current field of the video signal;
   comparing the field count of the current field with the field count from the directory of the beginning field of the desired user selectable video signal segment to determine the number of fields in the gap between the current field and the beginning field of the desired user selectable video signal segment;
   assembling the RGB segment necessary to fill the gap from the information for assembling RGB fields; and
   filling the gap with the assembled RGB segment to form a substantially continuous video signal.

8. The method of claim 7 wherein the video signal is preprogrammed in the active video portion thereof with the data.

9. The method of claim 7 wherein the information for assembling the RGB segments includes tags indicating the length in fields of each RGB segment, and wherein storing comprises storing the information for assembling the RGB fields in each of the RGB segments along with the length tag therefor.

10. The method of claim 9 including, between comparing and assembling, selecting the RGB segment having the shortest length longer than the gap to be filled.

11. The method of claim 9 including, between comparing and assembling, selecting a combined RGB segment having a length longer than the gap by summing the lengths of two or more RGB segments.

12. The method of claim 9 wherein filling comprises filling the gap with successive RGB segments to form a substantially continuous video signal.

13. The method of claim 7 including:
   receiving user input indicating which RGB fields to overlay onto which fields in the video signal,
   assembling the user indicated RGB fields from the information for assembling RGB fields, and
   overlaying the user indicated fields in the video signal with the user indicated RGB fields by switching between the fields to form a composite video signal.

14. The method of claim 7 including locating the beginning field of the desired user selectable video signal segment by controlling a video storage device compatible with the video storage medium to locate the beginning field of the desired user selectable video signal segment.

15. The method of claim 14 wherein controlling comprises:
   learning the infra-red search and play commands of the video storage device;
   determining the search speed of the video storage device;
   calculating the time duration of the gap from the number of fields in the gap and the search speed of the video storage device;
   transmitting the infra-red search command to the video storage device; and after the time duration of the gap, transmitting the infra-red play command to the video storage device.

16. The method of claim 15 wherein the video storage device is a video tape recorder, and wherein the video storage medium is video tape.

17. The method of claim 16 wherein the video tape is of approximately 30 minute duration.

18. The method of claim 17 wherein the RGB segments range in time duration from between about 10 seconds to about 60 seconds.

19. The method of claim 15 wherein determining the search speed of the video storage device comprises:
transmitting the infra-red play command to the video storage device;
reading an initial field count from the current field of the video signal;
transmitting the infra-red search command to the video storage device;
after a predetermined period of time, transmitting the infra-red play command to the video storage device;
reading a final field count from the current field of the video signal; and
calculating the search speed from playing an initial field of the video signal to playing a final field of the video signal.

20. A method of combining non-phase-modulated fields and digital audio with a video signal to form a composite video signal comprising:
providing a video signal preprogrammed in the video portion thereof with data, the data comprising
a listing of what portion of the video signal includes the data,
a field count in every field of the video signal,
information for generating digital audio programs,
information for assembling the non-phase-modulated fields,
a first index of which non-phase-modulated fields to combine with which fields in the video signal, and
a second index of which digital audio programs to combine with which fields in the video signal;
reading the listing of what portion of the video signal includes the data;
reading the remaining data from the listed portions of each field of the video signal;
decoding the remaining data into the information for assembling the non-phase-modulated fields, the information for generating the digital audio program and the indexes of which non-phase-modulated fields and which digital audio programs to combine with which fields in the video signal;
storing the decoded data;
reading a field count of a current field of the video signal;
comparing the field count of the current field with the indexes of fields in the video signal to be combined with non-phase-modulated fields and digital audio programs;
whenever the current field count matches a field in the first index, recovering the corresponding information for assembling non-phase-modulated fields, assembling the corresponding non-phase-modulated field, and overlaying the current field of the video signal with the assembled non-phase-modulated field by switching between the fields on a pixel by pixel basis according to the information for assembling the non-phase-modulated fields to form a composite video signal; and
whenever the current field count matches a field in the second index, recovering the corresponding information for generating digital audio programs, generating the corresponding digital audio program, and adding the digital audio program to the audio portion of the video signal to form a composite video signal.

21. The method of claim 20 wherein the video signal is preprogrammed in the active video portion thereof with the data.

22. The method of claim 20 including:
comparing the field count of the current field of the composite video signal with the index of fields in the video signal to be combined with the non-phase-modulated fields; and
whenever the current field count of the composite video signal no longer matches a field in the index, stopping the combining of the non-phase-modulated field with the current field of the video signal by switching video output to the video signal alone.

23. The method of claim 20 including:
comparing the field count of the current field of the composite video signal with the second index of fields in the video signal to be combined with the digital audio programs; and
whenever the current field count of the composite video signal no longer matches a field in the second index, stopping the combining of the digital audio program with the audio portion of the current field of the video signal by switching audio output to the audio portion of the video signal alone.

24. The method of claim 20 including receiving user input indicating which non-phase-modulated fields to combine with which fields in the video signal.

25. The method of claim 24 wherein the user input indicating which non-phase-modulated field to combine with which field in the video signal takes precedence over the index of which non-phase-modulated fields to combine with which fields in the video signal.

26. The method of claim 24 including receiving further user input indicating when to stop combining the non-phase-modulated fields with the current fields of the video signal.

27. The method of claim 20 including receiving additional user input indicating which digital audio programs to combine with the audio portion of which fields in the video signal.

28. The method of claim 27 wherein the additional user input indicating which digital audio program to combine with the audio portion of which field in the video signal takes precedence over the second index of which digital audio programs to combine with the audio portion of which fields in the video signal.

29. The method of claim 27 including receiving further additional user input indicating when to stop combining the digital audio programs with the audio portion of the current fields of the video signal.

30. A method of combining non-phase-modulated fields and digital audio with a video signal to form a substantially continuous video signal comprising:
providing a video signal preprogrammed with user selectable video signal segments and with data, the data comprising
a field count in every field of the video signal, and a data segment comprising information for generating digital audio programs, information for assembling non-phase-modulated segments, a directory of field counts in the video signal which define the beginning field of each of the user selectable video signal segments, and an index of which digital audio program corresponds with which non-phase-modulated segment;

reading the data in the data segment;

decoding the data into the information for assembling the non-phase-modulated segment, the information for generating the digital audio programs, and the directory of field counts in the video signal which define the beginning field of each of the user selectable video signal segments;

storing the decoded data;

receiving user input indicating a desired user selectable video signal segment;

reading the field count of the current field of the video signal;

comparing the field count of the current field with the field count from the directory of the beginning field of the desired user selectable video signal segment to determine the number of fields in the gap between the current field and the beginning field of the desired user selectable video signal segment;

locating the first field of the desired user selectable video signal segment from the directory of field counts;

assembling the non-phase-modulated segment necessary to fill the gap by recovering the information for assembling non-phase-modulated segments;

generating the corresponding digital audio program from the index of which digital audio program corresponds with which non-phase-modulated segment to accompany the assembled non-phase-modulated segment by recovering the information for generating digital audio programs; and filling the gap with the assembled non-phase-modulated segment and corresponding digital audio program to form a substantially continuous video signal.

31. The method of claim 30 wherein the video signal is preprogrammed in the active video portion thereof with the data.

32. The method of claim 30 wherein the information for assembling the non-phase-modulated segments includes tags indicating the length in fields of each non-phase-modulated segment, and wherein storing comprises storing the information for assembling the non-phase-modulated fields in each of the non-phase-modulated segments along with the length tag therefor.

33. The method of claim 32 including, between comparing and assembling, selecting the non-phase-modulated segment having the shortest length longer than the gap to be filled.

34. The method of claim 32 including, between comparing and assembling, selecting a combined non-phase-modulated segment having a length longer than the gap by summing the lengths of two or more non-phase-modulated segments.

35. The method of claim 34 wherein filling comprises filling the gap with successive non-phase-modulated segments to form a substantially continuous video signal.

36. The method of claim 30 including:

receiving user input indicating which non-phase-modulated fields to overlay onto which fields in the video signal, assembling the user indicated non-phase-modulated fields from the information for assembling non-phase-modulated fields, and overlaying the user indicated fields in the video signal with the user indicated non-phase-modulated fields by switching between the fields to form a composite video signal.

37. The method of claim 30 wherein the video signal is provided from a video storage medium, and wherein locating comprises controlling a video storage device compatible with the video storage medium to locate the inning field of the desired user selectable video signal segment.

38. The method of claim 37 wherein controlling comprises:

learning the infra-red search and play commands of the video storage device;

determining the search speed of the video storage device;

calculating the time duration of the gap from the number of fields in the gap and the search speed of the video storage device;

transmitting the infra-red search command to the video storage device; and after the time duration of the gap, transmitting the infra-red play command to the video storage device.

39. The method of claim 38 wherein the video storage device is a video tape recorder, and wherein the video storage medium is video tape.

40. The method of claim 39 wherein the video tape is of approximately 30 minute duration.

41. The method of claim 38 wherein determining the search speed of the video storage device comprises:

transmitting the infra-red play command to the video storage device;

reading an initial field count from the current field of the video signal;

transmitting the infra-red search command to the video storage device;

after a predetermined period of time, transmitting the infra-red play command to the video storage device;

reading a final field count from the current field of the video signal; and calculating the search speed from playing an initial field of the video signal to playing a final field of the video signal.

42. A method of combining RGB fields with a video signal to form a substantially continuous composite video signal comprising:

providing a video signal preprogrammed in the video portion thereof with data, the data comprising a listing of what portion of the video signal includes the data, a field count in every field of the video signal, information for assembling the RGB fields, a directory of field counts in the video signal which define the beginning field of user selectable video signal segments, and an index of which RGB fields to combine with which fields in the video signal;

reading the listing of what portion of the video signal includes the data;

decoding the data into the information for assembling the RGB fields, the directory of field counts in the video signal which define the beginning field of user selectable video signal segments, and the index of which RGB fields to combine with which fields in the video signal;

storing the decoded data;

receiving user input indicating a desired user selectable signal segment;

reading the field count of the current field of the video signal;

comparing the field count of the current field with the field count from the directory of the beginning field of the desired user selectable video signal segment to determine the time necessary to locate the desired user selectable video signal segment;

assembling any RGB fields necessary to fill the locating time from the information for assembling RGB fields;

locating the desired user selectable video signal segment;

filling the locating time with the assembled RGB fields to form a substantially continuous video signal;

whenever the current field count matches a field in the index, assembling the corresponding RGB field in the directory from the information for assembling RGB fields; and combining the RGB field with the current field of the video signal by switching between the fields according to the information for assembling the RGB fields to form a substantially continuous composite video signal.

43. The method of claim 42 wherein the video signal is preprogrammed in the active video portion thereof with the data.

44. The method of claim 42 including receiving additional user input indicating which RGB fields to combine with which fields in the video signal.

45. The method of claim 44 wherein the additional user input indicating which RGB fields to combine with which fields in the video signal takes precedence over the index of which RGB fields to combine with which fields in the video signal.

46. The method of claim 44 including receiving further user input indicating when to stop combining the RGB field with the current field of the video signal.

47. The method of claim 42 wherein the information for assembling the RGB segments includes tags indicating the length in fields of each RGB segment, and wherein storing comprises storing the information for assembling the RGB fields in each of the RGB segments along with the length tag therefor.

48. The method of claim 47 wherein the RGB segments range in time duration from between about 10 seconds to about 60 seconds.

49. The method of claim 42 wherein the video signal is provided from a video storage medium, and wherein locating comprises controlling a video storage device compatible with the video storage medium to locate the beginning field of the desired user selectable video signal segment.

50. The method of claim 49 wherein the video storage device is a video tape recorder, and wherein the video storage medium is video tape.

51. The method of claim 50 wherein the video tape is of approximately 30 minute duration.

52. A device for combining RGB fields with a video signal to form a substantially continuous video signal comprising:
a video signal preprogrammed with user selectable video segments and with data, the data comprising
a listing of what portion of the video signal includes the data,
a field count in every field of the video signal,
information for assembling RGB segments, and
a directory of field counts in the video signal which define the beginning field of the user selectable video segments;
a video storage medium having the preprogrammed video signal stored thereon;
means for reading the video signal from the video storage medium;
means for decoding the data;
means for receiving user input indicating a desired user selectable video segment;
means for locating the beginning field of the desired user selectable video segment;
a microprocessor for comparing a field count of the current field with the field count of the beginning field of the desired user selectable video segment to determine the time necessary to locate the desired user selectable video segment, the microprocessor for actuating the locating means to locate the desired user selectable video segment; and
a video processor for assembling the RGB segment necessary to fill the locating time from the information for assembling RGB segments to form a substantially continuous video signal.

53. The device of claim 52 wherein the video signal is preprogrammed in the video portion thereof with the data.

54. The device of claim 53 wherein the video signal is preprogrammed in the active video portion thereof with the data.

55. The device of claim 52 wherein the video storage medium is a video tape and wherein the reading means is a video tape recorder.

56. The device of claim 52 wherein the information for assembling RGB segments includes tags indicating the time duration of each RGB segment.

57. The device of claim 56 comprising means for storing the information for assembling RGB segments along with the corresponding time duration tags.

58. The device of claim 52 wherein the data comprises information for generating digital audio programs, and comprising a microcontroller for generating the corresponding digital audio program to accompany the assembled RGB segment from the information for generating digital audio programs.

59. The device of claim 52 comprising means for seamlessly switching from the RGB segment to the desired user selectable video segment once it is located.

60. A device for combining RGB fields with a video signal to form a composite video signal comprising:
a video signal preprogrammed with data, the data comprising
a listing of what portion of the video signal includes the data,
a field count in every field of the video signal,
information for assembling the RGB fields, and
an index of which RGB fields to combine with which fields in the video signal;
means for reading the data from the video signal;
means for storing the data;

a microprocessor for comparing a field count of current field with the index of fields in the video signal to be combined with RGB fields;

a video processor for assembling the corresponding RGB field in the index from the information for assembling RGB fields; and a switch for combining the RGB field with the current field of the video signal on a pixel-by-pixel basis according to the information for assembling the RGB fields to form a composite video signal.

61. The device of claim 60 wherein the video signal is preprogrammed in the video portion thereof with the data.

62. The device of claim 61 wherein the video signal is preprogrammed in the active video portion thereof with the data.

63. The device of claim 60 comprising a video storage medium having the preprogrammed video signal stored thereon, and wherein the reading means comprises a video storage device compatible with the video storage medium, and means for decoding the data into the listing, the field count, the information for assembling the RGB fields, and the index.

64. The device of claim 60 comprising means for receiving user input indicating which RGB fields to combine with which fields in the video signal.

65. The device of claim 60 wherein the user input takes precedence over the index.

66. The device of claim 60 wherein the data comprises information for generating digital audio programs and a second index of which digital audio programs to combine with which fields in the video signal, and wherein the microprocessor also compares the field count of the current field with fields in the second index to be combined with digital audio programs, and comprising a microcontroller for generating the corresponding digital audio programs in the second index from the information for generating digital audio programs, and comprising means for adding the generated digital audio programs to the audio portion of the video signal.

67. A device for combining non-phase-modulated fields with a video signal preprogrammed in the active video portion thereof with a data segment and with a field header in every field thereof; the data segment having items comprising information for assembling non-phase-modulated fields, tags indicating a length in fields of non-phase-modulated segments, a directory of field counts in the video signal which define the beginning field of video signal segments, and a script defining a default order in which non-phase-modulated segments and video signal segments are combined together to form a substantially continuous video signal; the field header having a field count and having prompts as to which non-phase-modulated fields to combine with which fields in the video signal segment to form a substantially continuous composite video signal comprising:

means for reading the data segment and the field header from the video signal;

means for storing the items in the data segment;

means for receiving user input indicating a desired non-phase-modulated segment or a desired video signal segment;

means for locating the beginning field of the video signal segments;

a video processor for assembling non-phase-modulated segments and non-phase-modulated fields from the information for assembling non-phase-modulated fields;

means for switching between non-phase-modulated segments and video signal segments to form a substantially continuous video signal, the switching means also for switching between an non-phase-modulated field and a video signal segment field on a pixel-by-pixel basis according to the information for assembling non-phase-modulated fields to form a composite video signal;

a microprocessor responsive to the tags, the current field count and the directory for selecting an non-phase-modulated segment of sufficient length to fill a gap between a current field count and the beginning field count of a desired video signal segment or a script defined video signal segment, and for controlling the video processor to assemble the non-phase-modulated segment and for controlling the switching means to fill the gap;

the microprocessor also responsive to user input and in the absence of user input the script for controlling the switching means to sequentially combine non-phase-modulated segments and video signal segments to form a substantially continuous video signal, and for controlling the locating means to locate the beginning field of video signal segments desired by a user or defined by the script; and the microprocessor also responsive to the current field count and the prompts for controlling the video processor to assemble the non-phase-modulated field, and for controlling the switching means to simultaneously combine the non-phase-modulated field with the current field of the video signal.

68. The device of claim 67 comprising a video storage medium having the preprogrammed video signal stored thereon, and wherein the reading means comprises a video storage device compatible with the video storage medium and means for decoding the data segment into the items and means for decoding the field header into the field count and the prompts.

69. The device of claim 68 wherein the video storage medium comprises a video tape, and wherein the video storage device comprises a video tape recorder.

70. The device of claim 69 wherein the video tape comprises video tape of about 30 minute duration.

71. The device of claim 70 wherein the non-phase-modulated segments have lengths corresponding to time durations ranging from between abut 10 seconds to about 60 seconds.

72. The device of claim 71 wherein the storing means comprises storing the information for assembling the non-phase-modulated fields in non-phase-modulated segments along with the tags indicating the length of the non-phase-modulated segments.

73. The device of claim 67 comprising second means for receiving user input indicating which non-phase-modulated fields to combine with which fields in the video signal segment on a pixel-by-pixel basis.

74. The device of claim 73 wherein the microprocessor is responsive to the second user input and in the absence of second user input the prompts for controlling the video processor to assemble the non-phase-modulated field.

75. The device of claim 67 wherein the data segment items comprise information for generating digital audio programs, and an index of which digital audio program corresponds to which non-phase-modulated segment, and wherein the field header comprises second prompts as to which digital audio programs to combine with which field in the video signal segment, and comprising a microcontroller for generating digital audio programs from the information for generating digital audio programs, and comprising means for adding the generated digital audio programs to the audio portion of the video signal, and wherein the microprocessor is also responsive to the index for selecting the corresponding digital audio programs to accompany the non-phase-modulated segments selected to fill the gap, and for controlling the microcontroller to generate the digital audio programs, and wherein the microprocessor is also responsive to the second prompts for controlling the microcontroller to generate the digital audio programs, and for controlling the adding means to add the generated digital audio programs to the audio portion of the video signal.

76. The device of claim 75 comprising third means for receiving user input indicating which digital audio programs to add to which fields in the video signal, and wherein the microprocessor is responsive to the third user input and in the absence of third user input the second prompts for controlling the microcontroller to generate the digital audio program, and for controlling the adding means to add the generated digital audio program to the audio portion of the video signal.

* * * * *